United States Patent
Dilje et al.

(10) Patent No.: US 9,121,458 B2
(45) Date of Patent: Sep. 1, 2015

(54) METHOD FOR PRODUCING A RING OF A SYNCHRONIZING DEVICE, AND A RING OF A SYNCHRONIZING DEVICE

(75) Inventors: Alexander Dilje, Schweinfurt (DE); Norbert Huhn, Schweinfurt (DE); Ulrich Lang, Mühlheim (DE)

(73) Assignee: AKTIEBOLAGET SKF, Gothenburg (SE)

(*) Notice: Subject to any disclaimer, the term of this patent is extended or adjusted under 35 U.S.C. 154(b) by 718 days.

(21) Appl. No.: 13/255,999

(22) PCT Filed: Mar. 6, 2010

(86) PCT No.: PCT/EP2010/001401
§ 371 (c)(1),
(2), (4) Date: Oct. 25, 2011

(87) PCT Pub. No.: WO2010/102765
PCT Pub. Date: Sep. 16, 2010

(65) Prior Publication Data
US 2012/0217115 A1    Aug. 30, 2012

(30) Foreign Application Priority Data
Mar. 12, 2009 (DE) .......................... 10 2009 012 961

(51) Int. Cl.
*F16D 23/02* (2006.01)
*F16D 23/04* (2006.01)
*F16D 23/06* (2006.01)

(52) U.S. Cl.
CPC .............. *F16D 23/025* (2013.01); *F16D 23/04* (2013.01); *F16D 2023/0631* (2013.01); *F16D 2023/0637* (2013.01); *F16D 2023/0681* (2013.01); *F16D 2250/00* (2013.01); *F16D 2300/06* (2013.01); *F16D 2300/10* (2013.01); *Y10T 409/303752* (2015.01); *Y10T 409/303808* (2015.01)

(58) Field of Classification Search
None
See application file for complete search history.

(56) References Cited

U.S. PATENT DOCUMENTS

| 4,606,683 A * | 8/1986 | Link et al. .................. 409/66 |
| 4,823,631 A * | 4/1989 | Kishimoto ................. 74/339 |
| 4,878,282 A | 11/1989 | Bauer |
| 4,944,378 A * | 7/1990 | Christian ................ 192/107 M |
| 5,038,628 A | 8/1991 | Kayama |
| 5,485,898 A * | 1/1996 | Patko ..................... 188/71.5 |
| 6,343,416 B1 * | 2/2002 | Miller et al. ............ 29/890.035 |
| 6,755,292 B2 * | 6/2004 | Yamamoto et al. ........ 192/45.1 |
| 6,834,751 B1 * | 12/2004 | Magee ..................... 192/48.91 |
| 6,960,107 B1 | 11/2005 | Schaub |
| 7,717,247 B2 * | 5/2010 | Stockl et al. ............. 192/53.34 |
| 2004/0081519 A1 * | 4/2004 | Gainer ..................... 407/49 |

FOREIGN PATENT DOCUMENTS

| AT | 410015 B | 1/2003 |
| DE | 143457 A1 | 8/1980 |
| DE | 3524412 A1 | 1/1987 |
| DE | 4334497 A1 | 4/1995 |
| DE | 19858987 A1 | 6/2000 |
| EP | 0897068 B1 | 3/2003 |
| FR | 2596121 A1 | 9/1987 |
| GB | 2189718 | * 11/1987 |
| WO | WO2009092553 A1 | 7/2009 |

* cited by examiner

*Primary Examiner* — Ramya Burgess
*Assistant Examiner* — Mark Manley
(74) *Attorney, Agent, or Firm* — Bryan Peckjian; SKF USA Inc. Patent Dept.

(57) ABSTRACT

A ring of a synchronizing device of a vehicle transmission includes a friction surface that interacts with a friction surface of another ring of the synchronizing device and at least one slide surface configured to slidably seat on an abutment surface of the synchronizing device. At least one curved groove is cut into the at least one slide surface by a whirling milling operation.

19 Claims, 1 Drawing Sheet

METHOD FOR PRODUCING A RING OF A SYNCHRONIZING DEVICE, AND A RING OF A SYNCHRONIZING DEVICE

CROSS-REFERENCE

This application is the U.S. national stage of International Application No. PCT/EP2010/001401 filed on Mar. 6, 2010, which claims priority to German patent application no. 10 2009 012 961.8 filed on Mar. 12, 2009.

TECHNICAL FIELD

The invention relates to a method for manufacturing a ring of a synchronizing device, wherein the ring has a friction surface for cooperating with the friction surface of another ring of the synchronizing device, as well as at least one slide surface for the slideably-borne seating on an abutment surface. Furthermore, the invention relates to a ring of a synchronizing device.

RELATED ART

A method for manufacturing a ring of the mentioned type, as well as a corresponding ring, are well known in the prior art. In particular, such rings are required in manual transmissions of motor vehicles in order to achieve a matching of the rotational speeds of two shafts during the gear change before these shafts are coupled in an interference-fit manner.

The main focus is therefore to design the friction surface of the ring so that it has a high wear resistance so that a large number of shifting operations can be synchronized before wear becomes noticeable.

Therefore, it is required for the operation and, in particular for achieving a high efficiency of the transmission, that the synchronizer rings involved exhibit only a minor drag moment, i.e. undesired friction should be kept as low as possible.

No specific measures are known in the prior art for the formation of the corresponding slide seats of synchronizer rings on shaft elements and/or on end sides of adjacent components.

SUMMARY

Therefore, in one aspect of the present teachings, a method as well as a ring of the above-mentioned type are preferably designed so that the drag moment of the ring, and thus the friction-caused power loss, can be kept as small as possible. Overall, the efficiency of the transmission can thus be as high as possible. The proposed designs can be manufactured cost-effectively.

In another aspect of the present teachings at least one of the slide surfaces of the ring has a plurality of curve-shaped grooves, which are produced by a whirling milling process.

Preferably, two sets of curve-shaped grooves, which intersect, are produced. The intersecting angle is preferably between 60° and 90° in this case.

In another aspect of the present teachings, a ring of a synchronizing device, which has a friction surface for interacting with the friction surface of another ring of the synchronizing device, as well as at least one slide surface for slidably seating on an abutment surface, preferably includes at least one slide surface having a plurality of curve-shaped grooves.

Again, two sets of curve-shaped grooves preferably are produced, which intersect at the above-mentioned preferred angle.

At least two intersecting points of intersecting curve-shaped grooves can be disposed side-by-side across the width of the ring in the axial direction. The curve-shaped grooves are preferably disposed equidistantly from one other, i.e. they are positioned in equal intervals.

According to a preferred embodiment of the invention, the curve-shaped grooves are disposed on a cylindrical inner surface of the ring. However, it is also possible that the curve-shaped grooves are disposed on an end face of the ring.

The maximum depth of the curve-shaped grooves advantageously falls between 0.1 and 1 mm.

The portion having the curve-shaped grooves can be coated with a slide material. Alternatively, it is also possible that the area having curve-shaped grooves is made of a slide material.

The slide material is preferably bronze or plastic.

The ring is, in particular, a component of a synchronizing device of a vehicle transmission.

The following should be noted with respect to the whirling (whirling milling) process utilized to form the curve-shaped grooves: Whirling is a cutting or machining operation that provides a geometrically-defined cut and can be viewed, in terms of the kinematics, as a special type of milling. Inwardly-directed cutting edges are used for external whirling; outwardly-directed cutting edges are used—as are preferred in the proposed method—for internal whirling.

The whirling tool, which determines the cutting speed, is eccentrically-positioned and rotates at a high rotational speed relative to the slowly-rotating workpiece. Here, the rotational advancement of the workpiece and the advancement of the tool holder along the longitudinal axis are kinematically coordinated using NC-advancement in accordance with the desired pitch. The cutting plane of the tool cutting edges is adjusted to the particular desired pitch by pivoting the whirling head about its vertical axis. The radial positioning of the whirling head determines the depth of the grooves that are produced.

Short cuts with comma-shaped ends are produced by the cutting tools during whirling. Although whirling is a method that utilizes discontinuous cutting, an advantageous cut formation results and both hard, brittle metals, which provide relatively long tool service lives due to the high percentage of carbides and nitrides, as well as ceramic cutting materials can be used.

If one compares the chip formation by whirling and milling, the movement paths of which are similar, it can be seen that different short chip shapes and cutting bump shapes result. In whirling, the cutting mechanisms and the progressions of the cutting force are more advantageous for the same advancement angle, so that correspondingly—faster cutting—and advancement speeds are also permitted than in milling.

In whirling and milling, the chips have the same surface area for the same external diameter and the same core diameter and for the angular speed that is set. The chip produced by whirling is longer and has a smaller maximum chip thickness, so that significantly smaller cutting forces and smaller elastic distortions on the workpiece occur. Furthermore, better surface finishes result than by milling.

During whirling, a polyhedron shape that closely approximates an ideal circle results; however, small peaks of the polyhedron can only be a few ten thousandth of a millimeter. Significantly smaller errors result during whirling at a constant advancement angle than during milling, i.e. larger advancement angles are possible during whirling without the resulting shape error increasing in an impermissible manner. It is therefore possible to select workpiece advancement values that are significantly larger, namely approximately three to four times as high as for milling, and still achieve a very good surface finish that is comparable to grinding.

Due to the fast cutting speeds and the minimal cutting circle, high advancement rate values and short chip removal times result with a good surface finish. Grooves are producible at high productivity in connection with a user-friendly and cost-effective tool system.

With the proposed approach for the manufacture of the ring of a synchronizing device and with the provided design of such a ring, it is possible to design the ring in a cost-effective manner so that it has a small drag moment during operation, i.e. the undesired friction of the ring is minimized.

Due to the machined, curve-shaped grooves, an optimal formation of a lubricating film by a lubricant is possible so that a low-wear sliding of the counterpart piece involved is made possible.

Exemplary embodiments of the invention are illustrated in the drawings.

DETAILED DESCRIPTION OF THE INVENTION

Figure 1:
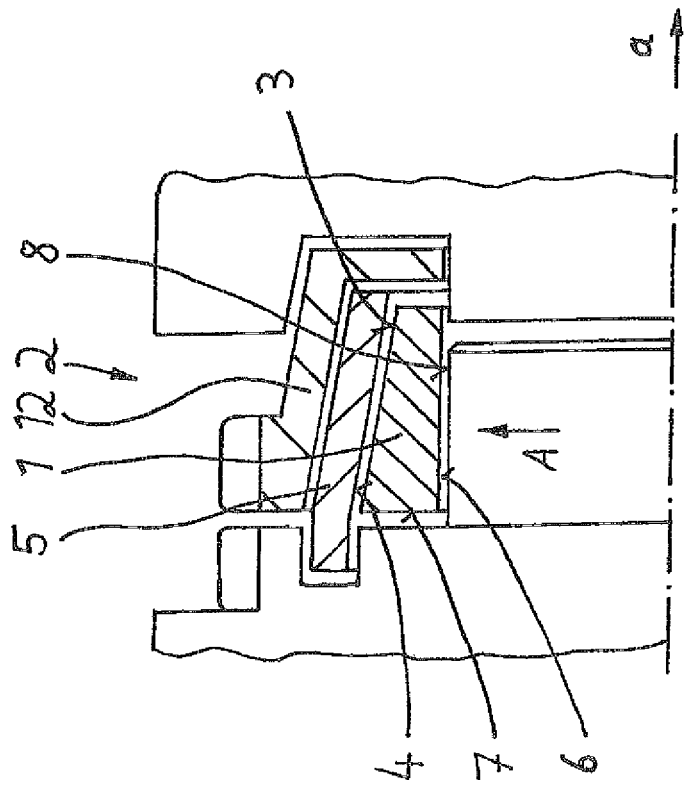
FIG. 1 shows a portion of a synchronizing device in radial cross-section.

A synchronizing device 2 is schematically illustrated in FIG. 1, wherein the depicted synchronizing stage has three synchronizer rings 1 (synchronizing inner ring), 5 (synchronizing intermediate ring) and 12 (synchronizing outer ring), which interact in a known manner. For the synchronization, the radially-outward-lying friction surface 3 of the ring 1 and the radially-inward-lying friction surface 4 of the ring 5, in particular, are brought into contact by relative movement in the axial direction a, so that it leads to a rotational speed equalization between the rings 1, 5 due the friction moment that results in this case. The same applies to the rings 5 and 12. The present case involves a known mode of operation of a synchronizing device of a transmission.

The focus of the present idea is, in particular, on the design of the slide surfaces 6 and 7, but not exclusively of the ring 1, via which surfaces the ring 1 abuts on at least one corresponding abutment surface 8. The depicted abutment surface 8 of FIG. 1 is the cylindrical surface area of a shaft-shaped portion of one of the components of the synchronizing device 2.

Only minimal friction is desired between the abutment surface 8 and the slide surface 6 of the ring 1, because the friction would become noticeable as a negative drag moment and it would decrease the efficiency of the transmission.

Therefore, it is provided that the slide surface 6 has a plurality of curve-shaped grooves.

Figure 2:
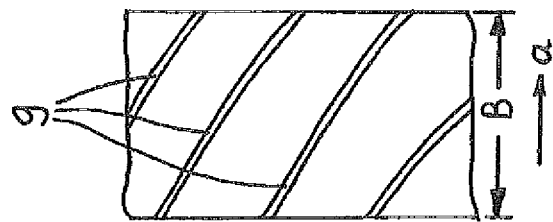

In FIG. 2, a set of grooves 9 is provided, which grooves 9 are arranged equidistantly to one another.

Figure 3:
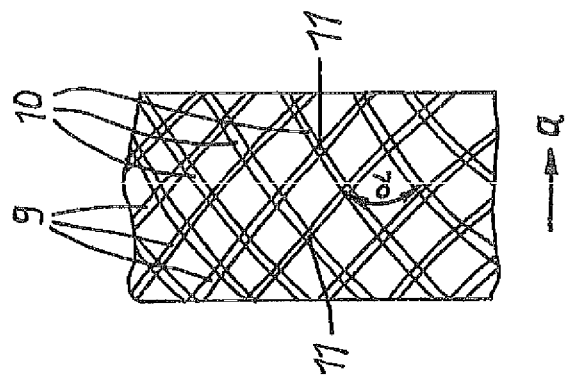
FIG. 2 shows the view A according to FIG. 1 (viewed from the radial direction) of a ring of the synchronizing device according to a first exemplary embodiment of the invention and FIG. 3 shows the view A according to FIG. 1 (viewed from the radial direction) of a ring of the synchronizing device according to a second exemplary embodiment of the invention.

In FIG. 3, two sets of grooves 9 and 10 are provided, which cross at an intersecting angle α. A number of intersecting points 11, at least two, preferably at least three intersecting points 11, are disposed side-by-side in the axial direction across the width B of the ring 1.

The proposed design can be provided in the same analogous manner for an end face, i.e. for the slide surface designated with 7.

Not only can the curve-shaped grooves 9, 10, which are provided, be produced very cost-effectively from a manufacturing point of view, but also lubricant (oil) is efficiently retained by the grooves 9, 10 in the contact portion of the sliding counterpart, so that an advantageous slide friction results, which leads to the low drag moment.

REFERENCE NUMBER LIST

1 Ring of a synchronizing device
2 Synchronizing device
3 Friction surface
4 Friction surface
5 Another ring
6 Slide surface (cylindrical inner surface)
7 Slide surface (end face)
8 Abutment surface (centering surface, opposite running surface)
9 Curve-shaped groove
10 Curve-shaped groove
11 Intersecting point
12 Another ring
α Intersecting angle
B Width
a Axial direction

The invention claimed is:

1. A ring configured for use in a synchronizing device, the ring comprising:
a friction surface configured to interact with a friction surface of another ring of the synchronizing device, and
at least one slide surface having minimal friction configured to slidably seat on an abutment surface of the synchronizing device with minimal friction drag, the at least one slide surface having at least one curved groove produced by a whirling milling operation.

2. The ring according to claim 1, wherein the at least one slide surface has two sets of curved grooves produced by the whirling milling operation.

3. The ring according to claim 2, wherein the two sets of curved grooves intersect at least two intersecting points in a width direction of the ring.

4. The ring according to claim 2, wherein the two sets of intersecting, curved grooves intersect at an angle (α) of between about 60° and 90°.

5. The ring according to claim 1, wherein curved grooves are disposed equidistantly from one other in a width direction of the ring.

6. The ring according to claim 1, wherein the at least one curved groove is disposed on an inner cylindrical surface of the ring.

7. The ring according to claim 1, wherein the at least one curved groove is disposed on an end face of the ring.

8. The ring according to claim 1, wherein the at least one curved groove has a maximum depth of between about 0.1 and 1 mm.

9. The ring according to claim 1, further comprising a slide material coated on the at least one curved groove.

10. The ring according to claim 1, wherein the at least one curved groove is formed in a slide material of the ring.

11. The ring according to claim 10, wherein the slide material is one of bronze and plastic.

12. The ring according to claim 4, wherein each set of curved grooves is disposed equidistantly from one other in the width direction of the ring and the curved grooves have a maximum depth of between about 0.1 and 1 mm.

13. The ring according to claim 12, wherein the curved grooves are disposed on at least one of an inner cylindrical surface of the ring and an end face of the ring.

14. A synchronizing device of a vehicle transmission comprising:
the ring of claim 1,
an abutment surface configured to slidably abut the at least one slide surface of the ring and
another ring configured to slidably abut the friction surface of the ring.

15. The ring according to claim 1, wherein the at least one curved groove is not a circumferential groove and is not an axial groove.

16. A synchronizing device of a vehicle transmission comprising:
an abutment surface;
a first ring abutting on the abutment surface, the first ring having at least one slide surface having minimal friction configured to slide circumferentially on the abutment surface with minimal friction drag during relative rotation of the first ring and the abutment surface, the first ring having a friction surface opposite the slide surface; and
a second ring configured to slidably abut the friction surface of the first ring,
wherein the at least one slide surface includes at least one curved groove produced by a whirling milling operation.

17. The synchronizing device according to claim 16, wherein the abutment surface is a radially outer surface and the first ring encircles the abutment surface, and
wherein the second ring encircles the first ring and includes a radially inner surface facing the friction surface of the first ring.

18. The synchronizing device according to claim 17, wherein the at least one curved groove is not a circumferential groove and is not an axial groove.

19. The synchronizing device according to claim 18, wherein the at least one slide surface comprises plastic or bronze.

* * * * *